United States Patent
Huomo et al.

(10) Patent No.: US 8,127,065 B2
(45) Date of Patent: Feb. 28, 2012

(54) STORAGE CARD HAVING SELECTABLE CONTACT ELEMENTS AND METHOD OF ITS OPERATION

(75) Inventors: Heikki Huomo, Circencester (GB); Graham Lawrence Rowse, Farnborough (GB)

(73) Assignee: Nokia Corporation, Espoo (FI)

( * ) Notice: Subject to any disclaimer, the term of this patent is extended or adjusted under 35 U.S.C. 154(b) by 69 days.

(21) Appl. No.: 11/918,690

(22) PCT Filed: Apr. 18, 2005

(86) PCT No.: PCT/IB2005/001019
§ 371 (c)(1),
(2), (4) Date: Oct. 17, 2007

(87) PCT Pub. No.: WO2006/111781
PCT Pub. Date: Oct. 26, 2006

(65) Prior Publication Data
US 2009/0043935 A1    Feb. 12, 2009

(51) Int. Cl.
*G06F 3/00* (2006.01)
*G06F 13/42* (2006.01)
*H05K 7/10* (2006.01)

(52) U.S. Cl. ............. 710/301; 710/8; 710/11; 710/14; 710/105

(58) Field of Classification Search .......... 710/2, 8, 710/11, 14, 74, 301, 105, 106, 311, 314, 710/300
See application file for complete search history.

(56) References Cited

U.S. PATENT DOCUMENTS

| | | | |
|---|---|---|---|
| 6,151,647 A * | 11/2000 | Sarat | 710/301 |
| 6,178,324 B1 | 1/2001 | Choquet et al. | |
| 6,439,464 B1 * | 8/2002 | Fruhauf et al. | 235/492 |
| 7,125,287 B1 * | 10/2006 | Chou et al. | 439/660 |
| 2001/0000405 A1 * | 4/2001 | Gray et al. | 235/375 |
| 2001/0000814 A1 * | 5/2001 | Montgomery et al. | 710/10 |
| 2002/0103944 A1 * | 8/2002 | Feuser et al. | 710/2 |
| 2004/0164170 A1 * | 8/2004 | Krygier et al. | 235/492 |
| 2004/0249625 A1 * | 12/2004 | Leaming | 703/27 |

(Continued)

FOREIGN PATENT DOCUMENTS
EP    1258831 A2    11/2002

OTHER PUBLICATIONS

"Information technology—Identification cards—Integrated Circuit(s) Cards With Contact—Part 3: Electronic Signals and Transmission Protocols". International Standard ISO/IEC 7816-3. Second Edition. Dec. 15, 1997. Reference No. ISO/IEC 7816-3:1997(E).*

*Primary Examiner* — Thomas J Cleary
(74) *Attorney, Agent, or Firm* — Hollingsworth & Funk, LLC

(57) ABSTRACT

The present invention relates to a storage card having selectable contact elements a terminal capable of receiving said storage card and method of its operation. The storage card with selectable contact elements, comprises an interface having a plurality of contact elements, a storage card controller, being connected to at least a subset of said contact elements, a storage memory device, being connected to said storage card controller, a switching unit, that is connected to said storage card controller and to at least one of said contact elements of said interface, wherein said storage card controller is connected to said switching unit to controllably select said at least one contact element.

17 Claims, 3 Drawing Sheets

U.S. PATENT DOCUMENTS

| | | |
|---|---|---|
| 2005/0005045 A1* | 1/2005 | Kim et al. ................ 710/74 |
| 2005/0059301 A1* | 3/2005 | Chou et al. ............... 439/660 |
| 2005/0224588 A1* | 10/2005 | Ruping et al. ............ 235/492 |
| 2006/0000917 A1* | 1/2006 | Kim et al. ................ 235/492 |
| 2006/0026332 A1* | 2/2006 | Yen ........................... 710/313 |
| 2007/0023503 A1* | 2/2007 | Kang ......................... 235/380 |
| 2007/0158439 A1* | 7/2007 | Conner et al. ............ 235/492 |
| 2007/0300001 A1* | 12/2007 | Dirscherl et al. ......... 710/301 |

* cited by examiner

STORAGE CARD HAVING SELECTABLE CONTACT ELEMENTS AND METHOD OF ITS OPERATION

FIELD OF THE INVENTION

The present invention relates to improvements in existing storage cards, such as SIM (subscriber identification member)/smart cards that would allow more flexibility in developing applications for SIM/smart cards. More specifically the present invention relates to improvements in SIM/smart card interfaces.

BACKGROUND

The problem with current SIM/smart card solutions and especially the ISO7816 interface is that the currently existing smart cards have only 3 "free" contact pins and there will be several applications that would need to interface the secure smart card element including e.g. USB (Universal Serial Bus) & NFC (Near Field Communication) (e.g. payment/ticketing) applications.

The ISO/IEC ISO7816-3 specification of 1997 in English is downloadable from the internet, while the specification ISO/IEC ISO7816-4 has been withdrawn.

It is known in the art to provide devices with combined interfaces capable of receiving different kinds of memory cards as it is e.g. disclosed in U.S. Pat. No. 6,612,498. This document discloses a mobile station (MS) that includes an interface card slot (SLOT) to which it is possible to connect either an MMC-card or a small SIM-card. A separate adapter the size of an MMC-card is used to connect the small interface card, or, in addition to the first contact pins for use of an MMC-card, second contact pins for use of an SIM-card are arranged to the interface card slot. The operating voltage of the interface card is selected to fit the currently used interface card.

It is also known in the art to use a switching circuitry to receive different memory cards in a common connector, wherein a device can arbitrate between different memory card interface modes. Such an electronic device capable of receiving a number of different memory cards is e.g. disclosed in the U.S. Pat. No. 6,857,038. This document discloses a common connector for memory cards and a switching arbitration method for the shared pins of the connector, i.e., a common connector which allows many different types of memory cards to be inserted in and fixed at different times.

It is known to provide devices which are able to receive different kinds of memory cards such as e.g. SD (Secure Digital), MMC (Multi-Media Card), ISO7816 SIM cards (subscriber identification means cards) or SM (smart media).

Especially in case of SIM cards of mobile terminals with a set format and a limited number of connection contacts, the standard ISO7816 interface must be retained so that operators can issue new SIM cards that will still work in older terminals. That is, it is a requirement that the existing interface must be retained for all the other non-phone applications that still use the same interface connections. As there are several different proposals for using the few remaining pins there is a conflict between these several applications to use the same contacts for differing signal levels and protocols.

SUMMARY

Starting from the state of the art it is advantageous to have devices, which are able to read different types of memory cards. But anyhow there is no memory card that is capable of being operated in different slots and with different electrical interfaces.

It is also desirable to provide a memory card having the capability to be operated with an increased data transfer rate.

It is also desirable to have a memory card having a capability to be operated with adaptable interface characteristics to enable downward and upward compatibility of a memory card.

It is desirable to reduce incompatibilities between card reader devices and memory cards.

It is also desirable to enable well-established interfaces to be suitable for some new applications.

This object is solved by a device with the features of claim 1, a storage system with the features of claim 10 and a method according to claim 11, and other embodiments are discloses in the dependent claims.

According to a first aspect of the present invention, there is provided storage card having selectable contact elements. The storage card comprises an interface with a number of contact elements, a storage card controller, being connected to at least a number of said contact elements of said interface and a storage memory device, being connected to said storage card controller. The storage card further comprises a switching unit that is connected to said storage card controller and to at least one of said contact elements of said interface. Said storage card controller is further connected to said switching unit to controllably select said at least one contact element of said interface.

That is, the storage card has an electrical interface with a number of contact elements, wherein a storage card controller of said storage card is capable of changing the wiring of (at least a few of) the contact elements of the smart card. In the basic implementation the storage card controller may change the wiring arbitrarily. In other embodiments the storage card controller may only change the wiring of some of the contact elements.

It is possible that the storage card controller selects its own contact elements. It is also envisaged that the storage card controller is hardwired to a number of contact elements, and only controls or selects other contact elements for additional electric or electronic components on said storage card.

That is, the storage card controller may redirect free contract elements of a present interface to use them also to exchange data with one or more different applications running on said storage card. The expression "storage card" is used to encompass all kind of storage card and smart media cards that can be used to store data and applications and to execute applications on a storage card controller of said card.

The storage card controller and the switching unit enable the storage card to allow currently active applications running on said storage card controller or on said storage card to interface with free contact elements of the storage card interface on demand and control said operation correspondingly.

This interfacing with free or actually not used contact elements of the storage card interface on demand allows e.g. the card to increase the data transfer rates via said interface. This interfacing with free or actually not used contact elements of the storage card interface on demand allows e.g. the card to start e.g. a second application to exchange data rates via the actually not used contact elements of said interface.

This implementation of free contact elements may be used to perform data transfer, for e.g. coding and decoding applications, storing procedures or data retrieving tasks.

To be able of fully utilizing the advantageous features provided by the present invention it is necessary that the counterpart of the storage medium is also able to access the "unused contact elements".

The interface, the switching unit and part of the storage card controller (that is responsible for operating the switching unit) may be implemented as switchyard/switch matrix interface that handles the interaction with the active applications and controlling/reserving of the contact elements.

In an example embodiment of said storage card said storage card controller is provided with an evaluation circuit. The evaluation circuit is provided to evaluate a received bit sequence indicative of type of interface and of at least one contact element to be selected. The evaluation circuit is provided to determine a required switching pattern for said switching unit (e.g. by querying the storage device) to select said indicated at least one contact element and a required data exchange protocol to operate said selected at least one contact element.

This implementation enables a connected device to determine which different types of interfaces the storage card can support for communicating via actually not used contact elements.

In another example embodiment of the present invention said storage card controller is configurable to use different protocols for exchanging data via selected contact elements according to e.g. an indicated type of interface.

This implementation enables a connected device to determine which different types of interfaces and protocols the storage card can support for communicating via actually not used contact elements. The data necessary to execute the different protocols may be stored e.g. in the memory unit of the storage card. Each interface comprises two or more different aspects such as a mechanical interface, an electrical interface, data transfer protocols and signal levels. In a simplest form, the embodiments of the present invention may be interpreted as storage card controller plugging a number of well known interfaces (preferably with few contacts) such as e.g. USB, twisted pair, a proprietary debug interface, AFNOR, S2C or fire wire with a few single wired cables to the free contacts of a multi contact interface (according to information received via used contacts of said interface).

In yet another example embodiment of the present invention said interface comprises an ISO7816 interface with 8 contact elements.

The ISO7816 contact format is known from SIM (subscriber identification member) cards used in mobile phones e.g. in GSM (global system for mobile communication) cellular telephone systems. The SIM-card of a mobile terminal is a well-known set format and has a limited number of connections. If any changes to SIM-cards are intended, the standard ISO7816 interface must be retained so that operators can issue a new SIM card that is still operable in older mobile terminals. Additionally, the existing interface must also be retained for all the other non-phone applications that still use only the original interface connections. The ISO7816 contact format comprises at least two not used contact elements. These free contact elements may be used to provide an "extended" ISO7816 contact format wherein the fee pins are allocated or mapped to a single other interface (such as e.g. USB).

With the present invention free pins can arbitrarily be mapped to a number of (at least 2) different applications (interface protocols, signal levels and the like) according to information received via the used contact elements of the ISO7816 contact format. It is also contemplated to use the same contact format to increase the operational speed of an existing ISO7816 interface by utilizing also the "free contacts" for data transfer. However, the ISO7816 contact format is used for smart cards in many forms and applications. The fact that the storage card comprises an ISO7816 contact format does not explicitly exclude that also other interface contact elements are provided on the storage card.

Yet another example embodiment of the storage card comprises a crypto-engine and a non-volatile memory. That is this storage card can be used as SIM-card for GSM (Global system for mobile communication) cellular telephones.

In another example embodiment of said storage card said interface comprises at least three additional contact elements. These additional contact elements may be provided in addition to a standard interface such as e.g. an ISO7816 electrical interface. This embodiment may be used in connection with combined storage cards or e.g. for multi SIM-cards. The expression interface refers to all contact elements of said storage card.

In yet another example embodiment said storage card comprises information stored in said memory device which interface configurations are supported by the storage card, wherein said information is retrievable via selected contact elements. This embodiment enables a user of a connected terminal device to determine which kinds of interfaces and protocols may be mapped to actually not used contact elements of the interface. According to another implementation information related to the types of available applications may be retrievably stored on said storage card.

In another example embodiment said storage card further comprises a first application controller connected to said switching unit. The application controller may be coupled by said storage card controller to a number of free contact elements of the interface. In this implementation the storage card controller can connect (or disconnect) said application controller (e.g. an application specific integrated circuit) to free (actually not used) contact elements of the interface.

In yet another example embodiment said storage card further comprises a second application controller connected to said switching unit. In this implementation the storage card controller can connect (or disconnect) said first or said second application controller to free (actually not used) contact elements of the interface. This allows a connected terminal device to select via the storage card controller to select a type of interface, a protocol and an application to be mapped to the free contacts of the interface.

In another example embodiment said storage card further comprises a signal detection circuit for keeping the free contact elements under surveillance to detect if signals following a certain protocol can be detected that are originating from a connected terminal device. The signal detection circuit is connected to at least one of said contact elements and to said storage card controller. The signal detection circuit can be directly connected to contact elements. It is also contemplated that the signal detection circuit is connected to contact elements via the switching unit. The signal detection circuit is connected to the instance controlling (storage card controller) the switching unit to be able configure contact elements according to a received signal pattern indicative of a specific interface protocol. It is also envisaged to implement the signal detection circuit in the controller itself e.g. in form of software program periodically surveying free contact elements.

The storage card may be provided with an evaluation circuit to determine if a connected device is tying to connect the storage card via known protocol via the free contact elements. This embodiment provides an increased the functionality to devices that can access the free contact elements only for a single task with only a single (e.g. proprietary) protocol. This implementation relieves a connected terminal from the task of sending information for identifying protocols and contact elements on the card for configuration. This embodiment enable a downward compatibility of the storage card even to terminal devices that are not capable of indicating a used protocol. It is for example possible to configure the storage card controller to survey the free contact elements for certain signals. It may be envisaged to implement only a survey for a defined number of protocol signals, as future terminals or terminal devices may be capable of indicating certain protocols, and this implementation is only relevant for terminals that are not able to indicate certain contact elements/protocols and it is expected that there proprietary solutions will disappear from the market.

According to another aspect of the invention an electronic terminal device is provided that comprises an interface for a storage card with selectable contact elements. The electronic terminal comprises an interface, a processing unit a storage memory device and a switching unit. The interface has a plurality of contact elements. The processing unit is connected to at least a subset of said contact elements of said interface. The storage memory device is connected to said processing unit. The switching unit is connected to said processing unit and to at least one of said contact elements of said interface. The processing unit is connected to said switching unit to controllably select said at least one contact element.

Basically the electronic terminal device is the counterpart of the storage card and required basically the same capabilities to select or map interfaces to contact elements.

It is for example envisaged to provide the electronic terminal with a setting circuit to send a bit sequence to a storage card to prescribe a type of interface and at least one contact element to be selected for said interface. This circuit may prescribe a required switching pattern of a connected storage card.

It is also contemplated to use a DIN ISO7816 interface with 8 contact elements as interface with selectable contact elements, and selectable data transfer protocols.

It may be envisaged to provide the electronic terminal device also with an interface that comprises at least three additional contact elements.

The electronic terminal device may be configured to retrieve information (e.g. by a determination circuit) stored on said storage card to determine which interface configurations a connected storage card supports.

In an example embodiment of the present invention said electronic terminal device comprises a mobile telephone. In fact it may also be interpreted as a mobile telephone with the capability connect to a storage card with selectable contact elements. However it may be necessary to mention that the mobile phone may comprise the usual components such as HF circuitry, antennas, digital signal processing means, processing units, keyboards, keypads, displays, loudspeakers, microphones an all other components such as camera modules, radios, game applications. A mobile telephone may use this interface to use all technological aspects of storage cards with selectable contact elements to access a wider variety of applications provided on future storage cards. It is also contemplated to use the interface to a SIM card with selectable contact elements of a mobile cellular phone to be able to store more data on an SIM-card and to access the data faster. It may also be envisaged to implement a mobile phone that is able to access additional applications on such an SIM-card with selectable contact elements.

According to yet another aspect of the present invention a storage system is provided. The storage system comprises a terminal device with a card interface for connecting a storage card having selectable contact elements, wherein a storage card having an interface with a number of contact elements, a storage card controller, a storage memory device and a switching unit, as disclosed in the above specification is inserted in said card interface. In this system a terminal device can access certain applications on said storage card via fee contact elements of said terminal and said storage card. It is also to be noted that the device has to be able to access these free contact elements for accessing a certain application on said storage card. However the terminal device may only be able to access a single (proprietary) interface standard via said fee contact elements.

It may also be envisaged to provide a passive signal detection circuit in said storage card to keep the free contact elements under surveillance to detect if signals following a certain protocol can be detected that are originating from a connected terminal device.

According to another aspect of the present invention a method for selecting contact elements of an interface on a storage card, comprising the steps of receiving a bit sequence at a storage card controller via a contact elements of an interface, wherein said bit sequence is indicative of at least one a type of interface terminal and indicative of at least one contact element, evaluating said received bit sequence to determine a switching configuration of switching unit, and configuring said switching unit according to said indicated type of interface to provide said indicated type of interface terminal at said indicated contact element.

The bit sequence may be received at said storage card controller via at least one contact element of an interface and via a switching unit provided in said storage card, or directly from said contract elements. Said bit sequence is indicative of at least one type of interface terminal of the storage card controller or of another equipment on said storage card (another controller of e.g. an application specific integrated circuit), and is also indicative of at least one contact element.

That is, the received information provides a mapping relationship of contact elements to interface terminals of devices on the storage card. It is envisaged that interface terminals of storage card equipment is provided for the use with predefined interface protocols. It is expected that the bit sequence indicative of the interfaces and the contact elements is received at the storage card controller in a default mode of said storage card or said switching unit if the storage card controller is not hardwired to its respective contact elements.

The detected mapping relation is then implemented by configuring or controlling said switching unit (by the storage card controller) according to said mapping relationship indicated in the received bit sequence. Thereby the controller can provide any kind of interface at said indicated contact element. That is, the method provides a possibility to allow currently active applications to interface with (free) contact pins of the storage card (e.g. a secure smart card element) on demand.

With this invention a storage card can multiplex the selection of preferred applications to free contact pins to reserve the free contact pins of the storage (SIM-/smart-) card for its purposes.

In an example embodiment the method further comprises configuring said controller according to a data exchange protocol related to said type of interface terminal indicated in said received bit sequence.

That is, the storage card controller can control the wiring between the controller and the contact elements of the interface and is also able to control accessing of different protocol stacks for exchanging data according to said actually selected/connected interface. This implementation is directed to the use of the storage card having controllers with universal input output terminals, capable of configuring the protocols used at said terminals and the signal used (including signal levels frequencies and the like).

In another example embodiment of the present invention said method further comprises receiving a query requesting for interface configurations that are supported by the storage card at the controller from said interface, retrieving information which interface configurations are supported by the storage card by the controller, and sending said retrieved information from the storage card controller via said switching unit to said contact elements.

The received query requesting which types of interface configurations are supported by the storage card is received from a connected terminal at the controller from said interface, (possibly via a switching unit) from a connected terminal device. The information which interface configurations are supported is retrieved by the controller e.g. from a connected memory unit.

This implementation can help to determine the interface modes that are supported by the storage card to provide a plug and playability to the storage card and to devices terminals.

In yet another example embodiment of the present invention the method further comprises sending an acknowledgement about configuring said switching unit according to said indicated type of interface from said storage card controller to said interface. This sending of an interface acknowledgement command can be performed via the active or the newly selected contact elements. When the acknowledgement is transmitted via the standard interface there is an advantage that there is always one interface that is operational. When the acknowledgement is transmitted via newly selected contact elements and the selected interface there is an advantage that it is possible to change all available contact elements.

According to yet another aspect of the invention, a computer program product is provided comprising program code means stored on a computer readable medium for carrying out the method for selecting contact elements of an interface of a storage card of the preceding description, when said program product is run on a controller of a storage card.

According to yet another aspect of the invention, a software tool is provided comprising program code means for carrying out the method of selecting contact elements of an interface of a storage card having a selectable contact elements of the preceding description when said program product is run on a computer or a network device.

According to another aspect of the present invention a computer data signal is provided. The computer data signal is embodied in a carrier wave and represents a program that makes the processor of a storage card having selectable contact elements perform the steps of the method selecting contact elements of an interface of a storage card as disclosed in the preceding description, when said computer program is run on a computer, or a network device.

BRIEF DESCRIPTION OF THE DRAWINGS

In the following, the invention will be described in detail by referring to the enclosed drawings in which.

DETAILED DESCRIPTION OF EMBODIMENTS OF THE INVENTION

Figure 1:
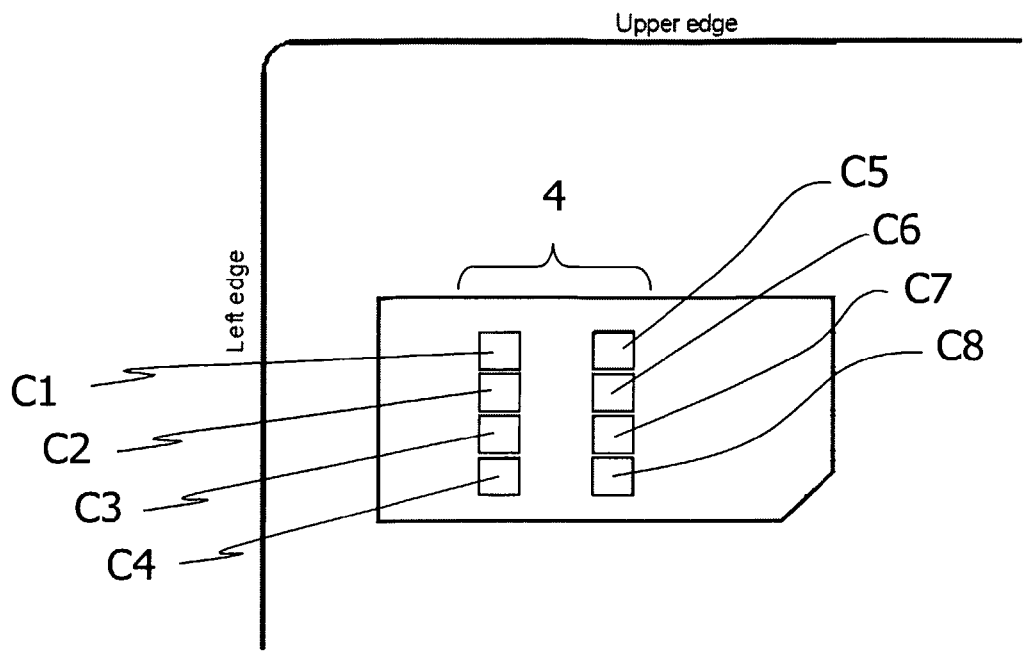
FIG. 1 is a schematic block diagram of a standard ISO7816 interface with eight contact elements.

In the detailed description, which follows, identical components have been given the same reference numerals, regardless of whether they are shown in different embodiments of the present invention. In order to clearly and concisely illustrate the present invention, the drawings may not necessarily be to scale and certain features may be shown in somewhat schematic form.

FIG. 1 depicts schematically a standard ISO7816 interface with eight contact elements, as it is known from chip cards, payment cards, telephone cards and SIM-(subscriber identification member)-cards.

In GSM the functions contained in the SIM card (e.g. a crypto-engine and a non-volatile memory etc.) are accessed over an UART-like bi-directional interface defined by ISO7816 (powered by 3.0 or 1.8V). However, this well-established interface is unsuitable for some new applications.

However, in Standard ISO7816 applications only six of the contact elements are actually used. Especially the contacts C4 and C8 are not in use. There are some implementations to use contacts elements C4 and C8 as a S2C interface ("SigIn-SigOut-Connection" from Philips semiconductors) to provide a two line interface for a proprietary data exchange in the field of near field communication.

There are also plans to implement a plug-and-play USB-based interface for PC users in smart cards. Two contacts (e.g. C4 and C8) can be used for the USB differential data signal. It is likely that a PC will have no ISO7816 interface support, so the IC card will be solely used via the USB (which is currently powered at 5.0V).

New final committee draft of ISO7816-3 by secretarial AFNOR (Association Française de Normalisation) it is suggested to use contact element C6 as input output.

Actually the following contacts are allocated as follows:

| Contact | Standard ISO7816 | ISO7816 + USB | ISO7816 + contactless |
| --- | --- | --- | --- |
| C1 | VDD | VDD | VDD |
| C2 | NRST | NRST | NRST |
| C3 | CLK | CLK | CLK |
| C4 | Not used | DP (USB) | ANT+ |
| C5 | VSS (GND) | VSS (GND) | VSS (GND) |
| C6 | VPP (no longer used) | VPP (no longer used) | VPP (no longer used) |
| C7 | IO | IO | IO |
| C8 | Not used | DM (USB) | ANT− |

Since two of the pins are used for the power and ground connection, only 6 pins remain for all the interface options.

| | |
|---|---|
| ANT+ | SigIn: provides the data from a Secure IC |
| ANT− | SigOut: provides clock and data to a Secure IC |
| CLK | "clock signal" |
| DM | a USB Interface contact |
| DP | a USB Interface contact |
| IO | Input/output |
| NRST | "Non-Resident Specific Tasks" |
| VDD | Voltage Drain Drain (power supply) |
| VPP | Voltage Peak Peak |
| VSS (GND) | Voltage for Substrate & Sources (ground) |

Additionally, the contacts C4 and C8 are often also used in the SIM development/manufacturing as a debug/test interface, which is turned off when development/test has finished.

The contacts C4 and C8 may also be used for a direct antenna connection in contactless modes for dual SIM cards. Another implementation of dual-interface cards can combine the standard ISO7816 interface with an internal loop antenna (in credit-card size format) providing contactless operation e.g. according to ISO 14443. On such a card two contacts are allocated for the antenna RF connection. It is for example possible to use a credit card format with an antenna embedded in the plastic of the card.

However, in all examples cited in the description of FIG. 1 the pins (C4, C6 and C8) are exclusively used. It is clear that the above implementations cannot be used at once and required not the same voltages or standards.

Examples have also been expressed for the use of a USB interface to be made available within the terminal. For example network streaming of data may utilize the crypto engine contained in a conventional SIM-card. This has been a suggested use for USB on C4 and C8.

In conclusion the storage card (as e.g. a SIM card) is basically a smart card, which has a processor, an operating system and some memory with additional crypto functions. It should be considered as an independent processor in its own right. The storage card may have more than one controller. The storage card may also comprise an application specific integrated circuit (ASIC) that may have differing operating systems and applications loaded for differing functions using a common interface. However the interface has a fix number of physical contact elements, which represents its restriction.

Figure 2:
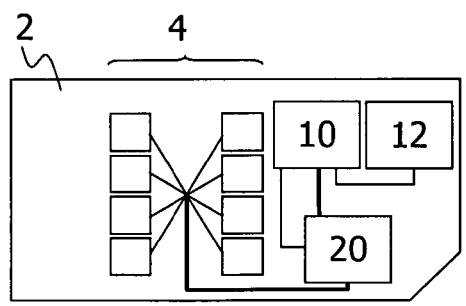
FIG. 2 is a schematic block diagram of a storage card according to an embodiment of the present invention.

FIG. 2 is a schematic block diagram of a storage card according to an embodiment of the present invention. The storage card 2 comprises an interface 4 (here depicted as an ISO7816 interface) a switching unit 20, a storage card controller 10 and a storage device 12. There is a boldly depicted bus line to indicate that lines for each of the contacts (C1 to C8) are connected to the storage card controller 10. The bus line is also connected from the switching unit 20 to the controller 10. There is also a control line from the storage card controller 10 to the switching unit 20 depicted to indicate that the storage card controller 10 controls the different switching states of the switching unit 20. The storage card controller 10 is also connected to a storage device or storage unit 12.

In this configuration new interfaces can be multiplexed to the free pins (e.g. C4, C6 and C8), one at a time. The used contacts of the established contact interface 4 are used to transfer data to control the configuration of the switching unit to provide a new interface between different states (i.e. control the switching state of the switching unit 20). This embodiment does not limit the future expansion of the interface, either it may be envisaged to implement additional mapping operations to components to be implemented in said card and said switching unit.

Moreover the host controller of a terminal connected to the storage card may query the storage card via (the active contact elements of) the ISO7816 interface, which interface configurations are supported by the storage card. Then, based on the received information, the Host controller of the terminal (not depicted) can choose one of the specific interfaces, which is supported by the device itself and configure its electrical connections accordingly. Additionally the Host controller of the terminal (not depicted) can configure via the controller 10 the switching unit (e.g. a switch yard) to route the signals to a given destination, or connect the free contact elements to respective contact terminals of the storage card controller. The switching unit may also have several destinations for the given interface signals e.g. the USB connection to host controller or a NFC chipset.

Figure 3:
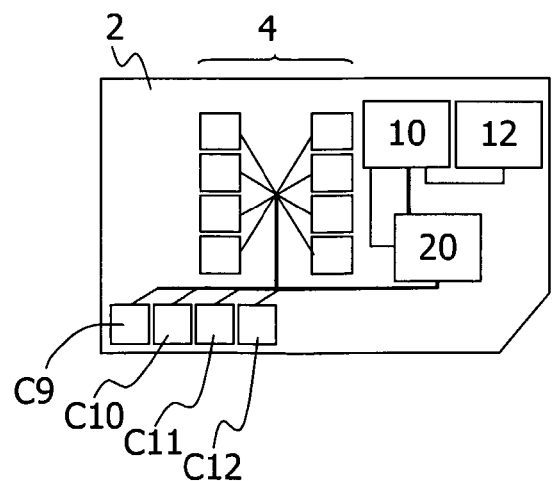
FIG. 3 is a schematic block diagram of a storage card with an increased number of contact elements according to an embodiment of the present invention.

FIG. 3 depicts a schematic diagram of a storage card having additional contact elements according to an embodiment of the present invention. In the depicted embodiment the standard ISO7816 interface 6 has been provided with additional four contact elements that may be referenced to as C9 to C12.

Figure 4:
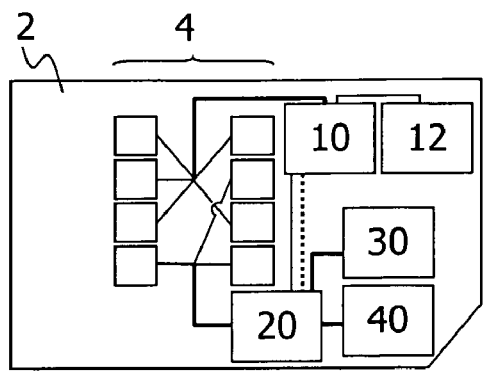
FIG. 4 is a schematic block diagram of a storage card with an increased number of contact data processing units and a restricted number of switchable contact elements according to an embodiment of the present invention.

FIG. 4 depicts a schematic diagram of a storage card having a first controller 30 and a second controller 40 in addition to the storage card controller 10 according to an embodiment of the present invention. The device is depicted with the standard ISO7816 interface 4 provided with the conventional eight contact elements. In contrast to the other implementations, only the free or not used contact elements C4 and C8 of the ISO7816 interface are connected to the switching unit 20 to be shared between the first additional controllers 30 and a second additional controller 40. It is also envisaged to enable the storage card controller 10 to access the contact elements C4 and C8 via the switching unit. It is to be noted that it is envisaged that only the storage card controller 10 can control the switching state of the switching unit 20. In FIG. 4 (a SIM-card) there are 5 of the contact elements (C1-C3. C5, C7) actually in use as a well-standardized command interface (ISO7816-3 and -4). Now there are only three contact elements (C4, C6, and C8) and several different proposals how to use them for various purposes. These purposes include today the USB, S2C and a proposal for a single wire interface. Evidently all of these cannot be supported at same instance. It should also be avoided to increase the number of contact elements on the storage (SIM-) card. Especially in FIG. 4 it becomes is visible that different applications running on different controllers may be multiplexed via at least partially shared contact elements.

The storage (or SIM-) card may have more contact elements in future and they could also be allocated with the same method as described.

To notify the controller to select a certain contact interface (for interface functionality) a notation is required to define two parameters:
(i) The actual protocol (functionality) to be used and
(ii) The corresponding active (or free) contact element.

In addition to the implementation of FIG. 1 there is needed a method to allocate the protocol to any of the contact elements (C1 to C12). This may be implemented in that the first four bits define the protocol to be used and the next four bits define the contact element or elements. If for example in case of USB, it may be defined that C4 and C8 are used for USB. The next bit may have a format coding the contact element. In this way more than one extra interface can be defined so long as they are not using the same pins.

As an example, the protocol list may comprise four bits and each protocol may be numbered consecutively.

| | | |
|---|---|---|
| 0000 | ISO7816 | |
| 0001 | USB | (e.g. first controller 30) |
| 0010 | single wire (Axalto) | (e.g. second controller 40) |
| 0011 | Antenna ISO 14443 | |
| 0100 | etc. | |
| 0101 | | |
| etc. | | |

It is also envisaged to use 8 or 16 bit protocol lists to allocate single interface elements (e.g. DA and DM of USB) separately to each of the free or available contact elements.

Similarly a contact element list may comprise four bits and each contact element numbered consecutively.

In connection with embodiments presented on FIGS. 2 and 4 using a standard ISO7816 interface the contact element allocation table may be implemented less complicated, as only every unused contact element is allocated corresponding used/not.

| | |
|---|---|
| 00 | not used |
| 01 | contact element C4 |
| 10 | contact element C6 |
| 11 | contact element C8 |

An additional bit may be used to indicate if the contact element is used or not, to enable e.g. the rerouting of the USB DM contact e.g. from C6 to C8.

In connection with embodiments presented on FIG. 3 this table can be extended to any contact element since it could be that following start-up in ISO7816 communication. It may also be envisaged to change the whole interface after start up to another faster format, as one problem is the transmission speed of the ISO7816 interface.

| | |
|---|---|
| 0000 | not used |
| 0001 | contact element C1 |
| 0010 | contact element C2 |
| 0011 | contact element C3 |
| 0100 | contact element C4 |
| 0101 | contact element C5 |
| 0110 | contact element C6 |
| 0111 | contact element C7 |
| 1000 | contact element C8 |
| 1001 | contact element C9 |
| 1010 | contact element C10 |
| 1011 | contact element C11 |
| 1100 | contact element C11 (C9-C12 only for the embodiment of FIG. 3) |

This implementation also can use a "command" to set the functionality to be 1 byte in size.

The contact element allocation table could also be a list and the corresponding functionality to be presented in a table.

For example in connection with embodiment presented on FIG. 2, which has only allocated a bit for each of the free contact elements:

0001 could be USB 1(c4)0(c6)1(c8)0(not used) or 0001 1010, 0001 0011, 0001 1011 00 could be x 0100 for x on C6

In connection with embodiment presented on FIG. 3, the table can be extended to all contact elements (C1 to C12) and still only using 4 bits from e 0001 to 1100.

This provides for the current free contact elements to be specified and it is expandable to cover the change of interface on any of the contact elements. Since as has been defined above, not all devices start by using the ISO7816 interface (e.g. PCs using USB only) this provides for all future expansions.

The fact that with the present invention the storage card is both backward compatible by starting on ISO7816 and expandable for the addition of any other new interface on the same currently unused contact elements.

A convention that the command sequence in FIG. 3 is that most instances used two 8 bit terms to be sent should be that the true or + connection should be sent first in the paired sequence.

This method also requires keeping track of the protocol list and the contact element allocation list. It is envisaged to provide a standardized protocol list and the contact element allocation list. It is also contemplated to implement a proprietary or updateable protocol list to enable firmware updates in case of protocol list failures. The list may contain many different entries. It is also envisage to implement e.g. 16 bit protocol lists that should be sufficient to cover all protocol standards.

However this implementation requires that both devices (the terminal and the storage card) have the need to change the interface option, so both devices on ether side of this interface may as long as they both have the defined interface list select or change of a selection of contact elements.

As an addition to make the operation more resilient an agreement to switch could be indicated by returning an interface acknowledgement command (to be defined). Any interface allocation could be kept in an interface table on each device, so that any application in the storage card (SIM/smart) card or the terminal to which it is connected can be informed of the current selected interface/the currently selected contacted elements.

Figure 5:
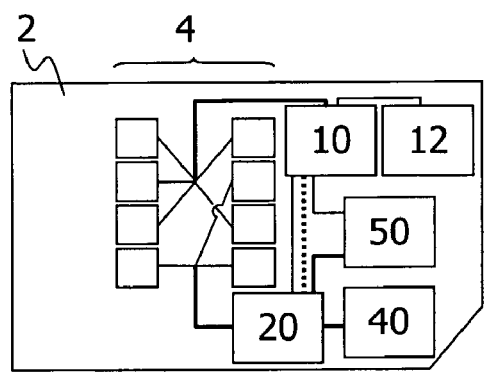
FIG. 5 is a schematic block diagram of a storage card with an additional contact data processing unit, a restricted number of switchable contact elements and a signal detection circuit according to an embodiment of the present invention.

FIG. 5 is a schematic block diagram of a storage card 2 as depicted in FIG. 3 with an additional contact data processing unit 40 (as depicted in FIG. 4), a restricted number of switchable contact elements (as also depicted in FIG. 4) and a signal detection circuit 50.

The signal detection circuit is connected to at least (one of said) switchable contact elements 4 and to said storage card controller 10. The signal detection circuit 50 can keep free contact elements under surveillance to detect in a connected state if signals can be detected that follow a known protocol. The signal detection circuit 50 is connected to contact elements 4 via the switching unit 20. The signal detection circuit 50 is connected to the storage card controller 10 to indicate the storage card controller that interface signal have been detected/recognized. As the signal detection circuit 50 is connected to contact elements 4 via the switching unit 20 the storage card controller may disconnect the signal detection circuit 50 after signals have been recognized and the switching unit has connected e.g. contact data processing unit 40 or the storage card controller 10 (via the dotted bus line) to free contact elements with the interface signals.

The signal detection circuit 50 may be provided with an evaluation circuit to determine if a connected device is tying to connect the storage card using a known protocol via the free contact elements. The evaluation circuit can be implemented e.g. in the storage card controller itself.

Figure 6:
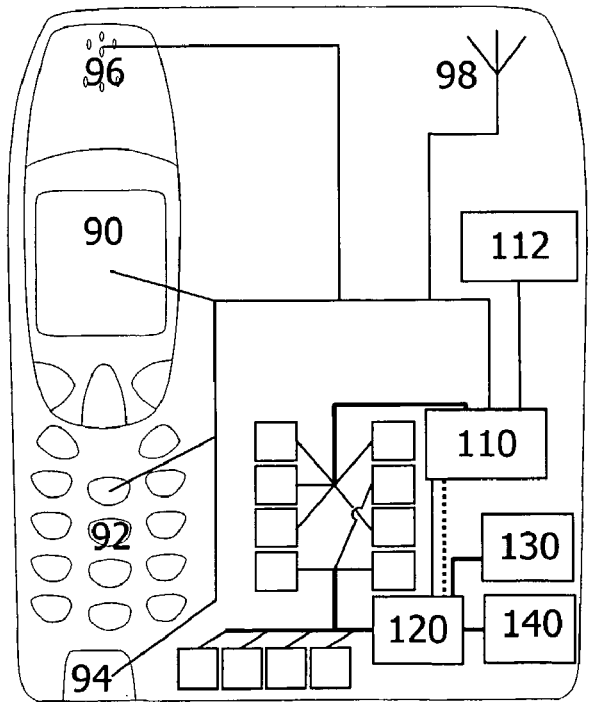
FIG. 6 is a schematic block diagram of an electronic terminal device embodied as a mobile telephone capable of receiving a storage card with switchable contact elements according to an embodiment of the present invention.

FIG. 6 is a schematic block diagram of an electronic terminal device embodied as a mobile telephone capable of receiving a storage card with switchable contact elements according to an embodiment of the present invention. The electronic terminal device comprises an interface for a storage card with selectable contact elements (C1 to C12 in analogy to the storage card depicted in FIG. 3). The electronic terminal comprises an interface, a processing unit 110 a storage memory device 112 and a switching unit 120. The processing unit 110 is connected to at least a subset of said contact elements of said interface. The storage memory device 112 is connected to said processing unit. The switching unit 120 is connected to said processing unit and to at least one of said contact elements of said interface. The processing unit 110 is connected to said switching unit 120 to controllably select said at least one of said contact elements if a storage card is inserted.

The electronic terminal device is also provided with an additional application components 130 and 140 (e.g. an audio player and a digital camera) that may access switchable contact elements to exchange or store data on a connected storage card (not depicted).

In the figure the electronic terminal device is embodied as a mobile cellular phone with a display 90, a keyboard 92, a microphone 94, a loudspeaker 96 and an antenna 98. In the depicted configuration the processing unit 110 is capable of fully controlling all aspects of cellular telephone communication. The interface is embodied as a modified ISO 7816 interface.

Figure 7:
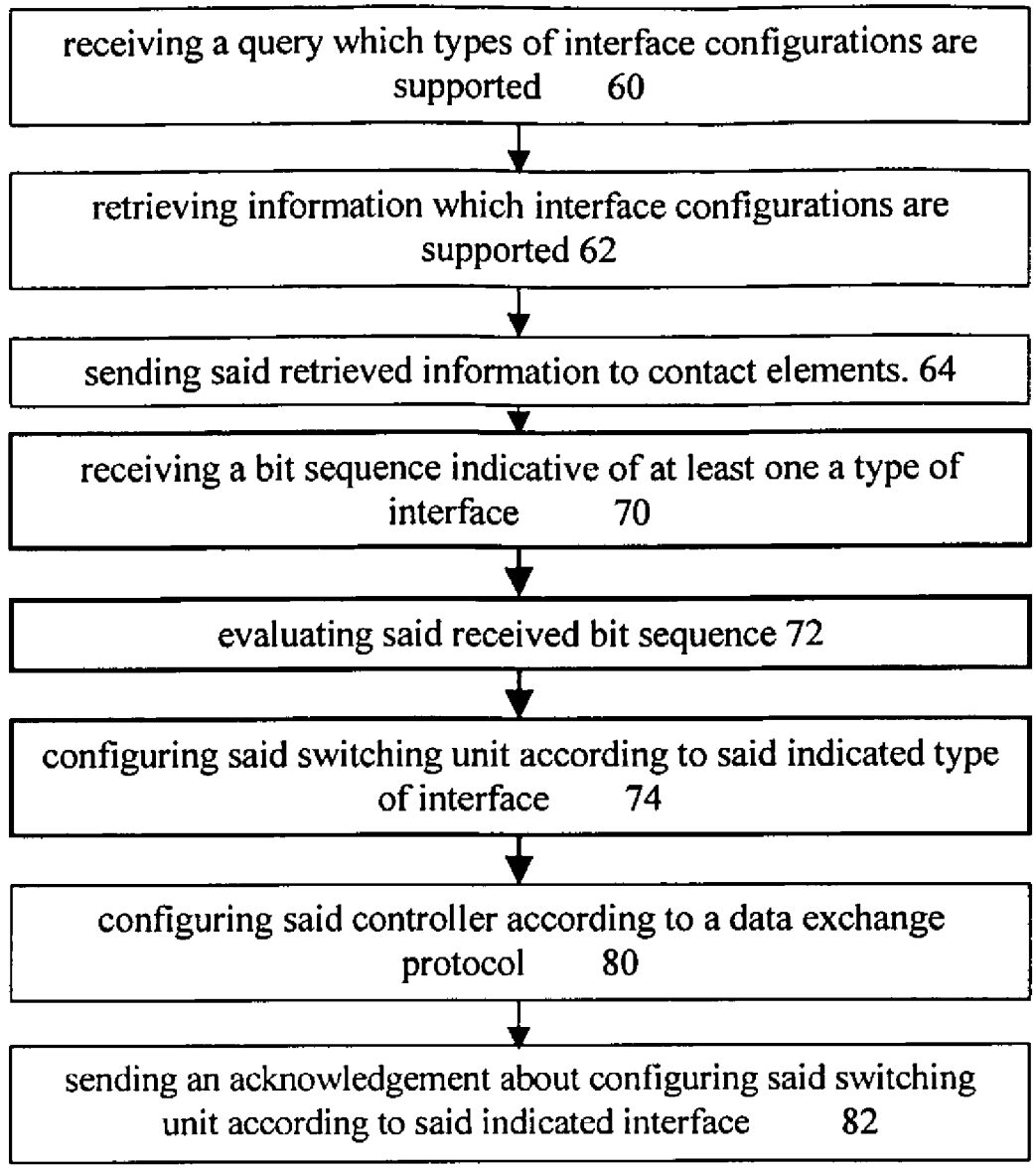
FIG. 7 is a flowchart of a method to select different contact elements embodying an aspect of the present invention.

FIG. 7 is a flowchart of a method to select different contact elements according to an aspect of the present invention. The method is directed to be executed on a storage card. A connected terminal (not depicted) may firstly determine if a connected storage card is capable of changing the interface or arbitrarily selecting free contact elements of a provided user interface. Therefore the terminal sends a query to determine which types of interface configurations the storage card supports. The query is received 60 by storage card controller 10. In a following step the storage card controller 10 retrieves 62 information which interface configurations are supported by the storage card e.g. from a storage device 12 of the storage card 2. The storage card controller 10 then sends 64 said retrieved information (possibly via said switching unit) to said contact elements and to the connected terminal. A host controller of a terminal may query which interface configurations are supported by the given storage card.

This part of the method is only optional, as the terminal may be aware of the capabilities of the storage card and vice versa.

In a next step the (not depicted) terminal device may intend to use free contact elements of the interface to connect to different applications, or want to use an application provided on said storage card and therefore requires a dedicated interface. The terminal sends via the active interface contact elements a bit sequence indicative of a desired interface.

The storage card controller receives in step 70 said bit sequence via active contact elements of said interface. Said bit sequence is indicating at least one type of interface terminal and may be indicative of at least one contact element allocated to said type of interface. The expression interface terminal is intended to be interpreted as a contact terminal of a controller or an application specific circuit in said storage card that can provide signal according to a type of interface protocol.

The storage card controller evaluates in step 72 said received bit sequence to determine a suitable switching configuration for switching unit. In a next step the storage card controller configures 74 said switching unit according to said indicated type of interface to provide said indicated type of interface terminal at said indicated contact element. To achieve this the storage card controller may connect suitable interface terminals provided on said storage card having indicated contact elements.

That is, the storage card may multiplex new interfaces to the free contact elements, one at a time. For example an established ISO7816-3 or -4 contact interface can be used to control the configuration of the new interfaces between different states. This solution is also expandable to other types of interfaces.

That is, the host controller of a terminal can select a specific supported interface and configure the electrical connections accordingly In case that the available interface terminals are configurable, said (storage card or any other) controller configures in step 80 the configurable terminals of said storage card according to a data exchange protocol related to said type of interface terminal indicated in said received bit sequence.

Finally the storage card controller may send in step 82 an acknowledgement about configuring said switching unit according to said indicated type of interface from said storage card controller to said interface (and further to a connected Terminal).

The present invention provides the advantage that manufacturers and the operators of storage cards, such as, for example SIM cards are free to choose at what time they enable a new functionality to be implemented in a storage card. The present invention provides also a possibility for the storage card manufacturers to choose which interfaces are to be supported on the device side or on the terminal side e.g. on a NFC (near field communication) chipset. Another advantage is that the current mechanical connectors to storage cards (e.g. SIM cards) need not to be changed. Another advantage resides in that if a new configurable storage card is put to an old device, the old functionality is not affected, as the used contact elements of the interface has not been changed so with the present invention a full backwards compatibility can be achieved. That is, with the present invention a scalable and future/backwards compatible solution for the usage of free contact elements in a known interface is provided. The present invention provides for full backward compatibility in storage cards such as SIM cards and all other smart card applications.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. A storage card comprising:
 a DIN ISO7816 interface with eight contact elements,
 a storage card controller, being connected to at least a subset of said contact elements,
 a storage memory device, being connected to said storage card controller,
 a switching unit, that is connected to said storage card controller and to at least one of said contact elements of said interface, and
 wherein said storage card controller is connected to said switching unit to controllably select at least one contact element, in response to a received bit sequence indicative of at least one contact element to be selected and a data exchange protocol to be used for the selected contact element where the data exchange protocol is selected from a list comprising a single wire interface, a SigIn-SigOut-Connection, a Universal Serial Bus differential data signal, and an RF antenna, to reconfigure the selected at least one contact element for use with a different interface configuration following start-up in ISO7816 communication protocol.

2. Storage card according to claim 1, wherein said storage card controller comprises an evaluation circuit provided to evaluate the received bit sequence, to determine a required switching pattern of said switching unit to select said indicated at least one contact element and a required data exchange protocol to operate said selected at least one contact element.

3. Storage card having selectable contact elements according to claim 1, wherein the storage card further comprises a crypto-engine and non-volatile memory.

4. Storage card having selectable contact elements according to claim 1, wherein information is stored in said memory device which interface configurations are supported by the storage card, wherein said information is retrievable via selected contact elements.

5. Storage card having selectable contact elements according to claim 1, further comprising a first application controller connected to said switching unit.

6. Storage card having selectable contact elements according to claim 5, further comprising a second application controller connected to said switching unit.

7. Storage card having selectable contact elements according to claim 1, further comprising a signal detection circuit connected to at least one of said contact elements and to said storage card controller.

8. The storage card having selectable contact elements according to claim 1, wherein the storage card comprises at least three additional contact elements.

9. A method for selecting contact elements of a DIN ISO7816 interface with eight contact elements on a storage card, comprising:
   initiating use of the interface in ISO7816 communication;
   receiving a bit sequence at a storage card controller via contact elements of said interface, wherein said bit sequence is indicative of at least one data exchange protocol selected from a list comprising a single wire interface, a SigIn-SigOut-Connection, a Universal Serial Bus differential data signal, and an RF antenna, and indicative of at least one of the contact elements,
   evaluating said received bit sequence to determine a switching configuration of a switching unit, and
   reconfiguring said switching unit according to said indicated at least one contact element to provide a different type of interface configuration at said indicated at least one contact element.

10. Method according to claim 9 further comprising, configuring said controller according to the data exchange protocol indicated in said received bit sequence.

11. Method according to claim 9 further comprising,
    receiving a query of which types of interface configurations are supported by the storage card at the storage card controller from said interface,
    retrieving information on which interface configurations are supported by the storage card by the storage card controller, and
    sending said retrieved information from the storage card controller to said contact elements.

12. Method according to claim 9, further comprising, sending an acknowledgement about configuring said switching unit according to said indicated at least one contact element from said storage card controller to said interface.

13. A computer program product for executing a method capable of selecting contact elements of an interface of a storage card having a selectable interface, comprising program code sections stored on a non-transitory machine-readable medium for carrying out the steps of claim 9 when said program product is run on a controller of a storage card having a selectable interface.

14. A storage card comprising:
    a DIN ISO7816 interface with eight contact elements;
    a storage card controller, being connected to at least a subset of said contact elements;
    a storage memory device, being connected to said storage card controller;
    a switching unit, that is connected to said storage card controller and to at least one of said contact elements of said interface;
    a signal detection circuit connected to at least one of said contact elements and to said storage card controller; and
    wherein said storage card controller is connected to said signal detection circuit and said switching unit to controllably select at least one contact element, in response to a received signal pattern indicative of a data exchange protocol to be used for the selected contact element where the data exchange protocol is selected from a list comprising a single wire interface, a SigIn-SigOut-Connection, a Universal Serial Bus differential data signal, and an RF antenna, to reconfigure the selected at least one contact element for use with a different interface configuration following start-up in ISO7816 communication protocol.

15. The storage card according to claim 14, wherein the storage card controller is configured to survey free contact elements for predefined signal patterns known to the storage card.

16. The storage card according to claim 15, wherein the predefined signal patterns correspond to proprietary protocols.

17. The storage card according to claim 14, further comprising at least three additional contact elements.

* * * * *